United States Patent
Zhong et al.

(10) Patent No.: US 12,061,904 B2
(45) Date of Patent: Aug. 13, 2024

(54) INFORMATION PROCESSING METHOD, INFORMATION PROCESSING APPARATUS AND SERVER APPARATUS

(71) Applicant: TOYOTA JIDOSHA KABUSHIKI KAISHA, Toyota (JP)

(72) Inventors: Lei Zhong, Chuo-ku (JP); Jing Ma, Yokohama (JP); Xiao Shao, Chiyoda-ku (JP); Ryokichi Onishi, Setagaya-ku (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 52 days.

(21) Appl. No.: 18/068,094

(22) Filed: Dec. 19, 2022

(65) Prior Publication Data
US 2023/0205520 A1    Jun. 29, 2023

(30) Foreign Application Priority Data
Dec. 23, 2021   (JP) ................. 2021-208921

(51) Int. Cl.
*G06F 9/30* (2018.01)
*G06F 9/54* (2006.01)

(52) U.S. Cl.
CPC ............ *G06F 9/3001* (2013.01); *G06F 9/547* (2013.01)

(58) Field of Classification Search
CPC ......... G06F 9/3001; G06F 9/547; G06N 3/09; G06N 20/00; G06N 3/098; H04L 67/10; H04W 4/80
See application file for complete search history.

(56) References Cited

U.S. PATENT DOCUMENTS

| | | | | |
|---|---|---|---|---|
| 10,810,491 | B1* | 10/2020 | Xia | G06N 3/04 |
| 11,227,050 | B1* | 1/2022 | Gates | G06F 21/56 |
| 11,804,050 | B1* | 10/2023 | Milletari | G06N 3/063 |
| 2006/0110712 | A1* | 5/2006 | Julia | G09B 19/06 434/156 |
| 2018/0267499 | A1* | 9/2018 | Tsuneki | G06N 20/00 |
| 2018/0307979 | A1* | 10/2018 | Selinger | H04N 7/183 |

(Continued)

OTHER PUBLICATIONS

Dongdong YE et al., "Federated Learning in Vehicular Edge Computing: A Selective Model Aggregation Approach", IEEE Access, vol. 8, 2020, 16 pages.

*Primary Examiner* — Farley Abad
(74) *Attorney, Agent, or Firm* — Oblon, McClelland, Maier & Neustadt, L.L.P.

(57) ABSTRACT

Each of information processing apparatuses generates a local model by performing machine learning of a global model using local data. Each of the information processing apparatuses calculates an evaluation value according to an evaluation index. The information processing apparatuses exchange the calculated evaluation values by proximity communication. Each of the information processing apparatuses determines whether the evaluation value of the information processing apparatus has a high evaluation or not based on a result of comparison between the evaluation value and evaluation values of the other information processing apparatuses. At least one of the information processing apparatuses that has determined that the evaluation value has the high evaluation transmits local model information indicating the generated local model to a server apparatus.

20 Claims, 8 Drawing Sheets

(56) References Cited

U.S. PATENT DOCUMENTS

| | | | |
|---|---|---|---|
| 2020/0242514 A1 | 7/2020 | McMahan et al. | |
| 2020/0380356 A1* | 12/2020 | Yoshiyama | G06N 3/063 |
| 2020/0402650 A1* | 12/2020 | Mitsumori | G06N 20/20 |
| 2021/0097381 A1* | 4/2021 | Daykin | G06F 11/3495 |
| 2022/0164661 A1* | 5/2022 | Uehara | G06N 3/044 |
| 2023/0015813 A1* | 1/2023 | Wang | G06Q 30/0207 |
| 2023/0237326 A1* | 7/2023 | Wu | G06N 3/08 |
| | | | 706/21 |

* cited by examiner

INFORMATION PROCESSING METHOD, INFORMATION PROCESSING APPARATUS AND SERVER APPARATUS

CROSS REFERENCE TO THE RELATED APPLICATION

This application claims the benefit of Japanese Patent Application No. 2021-208921, filed on Dec. 23, 2021, which is hereby incorporated by reference herein in its entirety.

BACKGROUND

Technical Field

The present disclosure relates to a technology of federated learning of a machine learning model performed between a server apparatus and a plurality of information processing apparatuses respectively mounted on mobile bodies such as vehicles.

Description of the Related Art

In a conventional machine learning method, individually obtained learning data are aggregated, and a machine learning model is trained using the aggregated learning data. This method, however, has problems such as that it costs much to aggregate the learning data (for example, time cost and communication cost) and that the calculation load on a computer that executes machine learning increases.

Therefore, federated learning is proposed as a method to solve the above problems. The federated learning is a method in which machine learning is distributedly performed without aggregation of learning data. In the case of performing federated learning between a server apparatus and a plurality of client apparatuses, each client apparatus individually collects local data. Each client apparatus generates a local model by performing machine learning of a global model using the collected local data. Then, each client apparatus transmits the generated local model to the server apparatus. The server apparatus generates a new global model by integrating local models received from the client apparatuses.

According to the federate learning method, it is possible to generate a trained machine learning model (the new global model) on which the local data obtained by the client apparatus is reflected, without uploading the local data to the server apparatus. That is, it is possible to save the cost of aggregating the local data to the server apparatus. Further, the calculation load on machine learning can be distributed to the client apparatuses. Therefore, in comparison with the conventional method described above, it is possible to generate a trained model that has learned much data, while realizing reduction in the costs and avoidance of concentration of the calculation load.

In Specification of Patent Literature 1, an example of a procedure for performing federated learning between a server apparatus and client apparatuses is proposed. In None-Patent Literature 1, a method for performing federated learning between a central server and vehicle clients is proposed, in which the central server and the vehicle clients mutually interact based on the two-dimensional contract theory to select vehicle clients to participate in the federated learning.

CITATION LIST

Patent Literature

Patent Literature 1: U.S. Patent Application Publication No. 2020/0242514

None-Patent Literature

None-Patent Literature 1: "Federated Learning in Vehicular Edge Computing: A Selective Model Aggregation Approach" by Dongdong Ye, Rong Yu, Miao Pan, Zhu Han (online; searched on Nov. 30, 2021), the Internet <URL: https://ieeexplore.ieee.org/document/8964354>

SUMMARY

An object of the present disclosure is to provide a technology making it possible to efficiently perform federated learning between a server apparatus and a plurality of information processing apparatuses respectively mounted on mobile bodies.

An information processing method according to a first aspect of the present disclosure may include: collecting, by each of a plurality of information processing apparatuses respectively mounted on different mobile bodies, local data; generating, by each of the plurality of information processing apparatuses, a local model by performing machine learning of a global model using the collected local data; calculating, by each of the plurality of information processing apparatuses, an evaluation value according to an evaluation index; transmitting, by each of the plurality of information processing apparatuses, the calculated evaluation value to other information processing apparatuses respectively mounted on one or more other mobile bodies existing near its own mobile body by proximity communication; receiving, by each of the plurality of information processing apparatuses, from each of the other information processing apparatuses respectively mounted on the one or more other mobile bodies, the evaluation value calculated by the other information processing apparatus by the proximity communication; determining, by each of the plurality of information processing apparatuses, whether the calculated evaluation value has a high evaluation or not by comparing the calculated evaluation value and the evaluation values received from the other information processing apparatuses; and transmitting, by at least one of the information processing apparatuses that has determined that the calculated evaluation value has the high evaluation, local model information indicating the generated local model to a server apparatus.

An information processing apparatus according to a second aspect of the present disclosure may be an information processing apparatus mounted on a mobile body and may include a controller configured to: collect local data; generate a local model by performing machine learning of a global model using the collected local data; calculate an evaluation value according to an evaluation index; transmit the calculated evaluation value to other information processing apparatuses respectively mounted on one or more other mobile bodies existing nearby by proximity communication; receive, from each of the other information processing apparatuses respectively mounted on the one or more other mobile bodies, the evaluation value calculated by the other information processing apparatus according to the evaluation index by the proximity communication; determine whether the calculated evaluation value has a high evaluation or not by comparing the calculated evaluation value and the evaluation values received from the other information processing apparatuses; and transmit local model information indicating the generated local model to a server apparatus if determining that the calculated evaluation value has the high evaluation.

A server apparatus according to a third aspect of the present disclosure may be a server apparatus configured to be communicable with each of a plurality of information processing apparatuses respectively mounted on different mobile bodies, each of the plurality of information processing apparatuses being configured to collect local data and generate a local model by performing machine learning of a global model using the collected local data, and may include a controller configured to: receive local model information indicating a local model from at least one information processing apparatus among the plurality of information processing apparatuses; and generate a new global model by integrating the at least one local model indicated by the local model information received from the at least one information processing apparatus. Each of the plurality of information processing apparatuses may be further configured to: calculate an evaluation value according to an evaluation index; transmit the calculated evaluation value to other information processing apparatuses respectively mounted on one or more other mobile bodies existing near its own mobile body by proximity communication; receive, from each of the other information processing apparatuses respectively mounted on the one or more other mobile bodies, the evaluation value calculated by the other information processing apparatus according to the evaluation index by the proximity communication; and determine whether the calculated evaluation value has a high evaluation or not by comparing the calculated evaluation value and the evaluation values received from the other information processing apparatuses. The at least one information processing apparatus may be an information processing apparatus that has determined that the calculated evaluation value has the high evaluation as a result of the comparison with the evaluation value.

According to the present disclosure, it is possible to efficiently perform federated learning between a server apparatus and a plurality of information processing apparatuses respectively mounted on mobile bodies.

DESCRIPTION OF THE EMBODIMENTS

Figure 1:
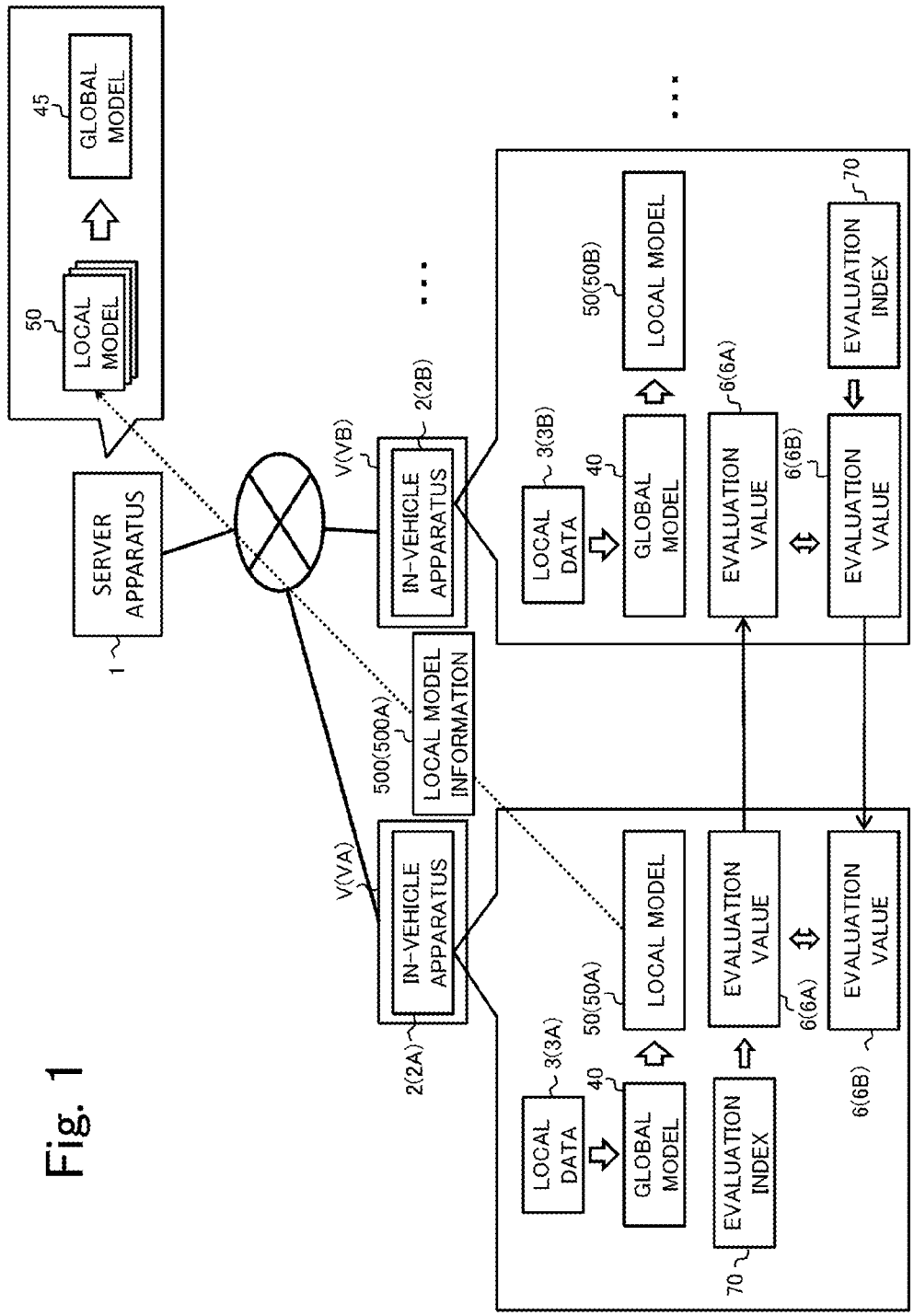
FIG. 1 schematically illustrates an example of a scenario to which the present disclosure is applied.

All of client apparatuses that can participate may participate in federated learning. However, when all of the client apparatuses participate in federated learning, the efficiency of updating a machine learning model (generating a new global model) deteriorates. Further, it is not necessarily possible to generate an accurate trained model. Therefore, selection (adjustments of the number) of client apparatuses to participate in federated learning may be performed.

A simple selection method is to randomly select client apparatuses to participate in federated learning from among a plurality of client apparatuses. In this method, however, since a server apparatus selects the client apparatuses to participate in the federated learning while the attributes (for example, the quality of obtainable local data, calculation capability, communication capability and the like) of the client apparatuses are not known, it is not necessarily possible to obtain local models appropriate for model update from the selected client apparatuses. Therefore, the model update becomes inefficient, and there is a possibility of causing increase in traffic.

As one method for solving the above, a method is conceivable in which a server apparatus checks the attributes (which may be read as a state, a status or the like) of each client apparatus and identify client apparatuses that can generate local models appropriate for model update. In this method, however, each client apparatus has to report its attributes to the server apparatus, which may cause a possibility of occurrence of a privacy problem. Further, the selection process is centralized, and data communication occurs between the server apparatus and each client apparatus in the selection process, which may cause a possibility of deterioration of the efficiency of the federated learning.

In the method proposed in None-Patent Literature 1, it is possible to ensure asymmetry of information between a server apparatus and each client apparatus (vehicle client) by adopting the two-dimensional contract theory. That is, without each client apparatus reporting information about its own attributes to the server apparatus as it is, the server apparatus can select client apparatuses to participate in federated learning based on the attributes of the client apparatuses. Therefore, the above problem about privacy can be solved. The selection process, however, is also centralized in this method, and complicated data communication is performed between the server apparatus and each client apparatus to solve a two-dimensional contract theory problem. Therefore, there is a possibility that deterioration of the efficiency of the federated learning is caused. Therefore, the conventional methods still have the problem about the efficiency of federated learning.

In comparison, an information processing method according to a first aspect of the present disclosure may include: collecting, by each of a plurality of information processing apparatuses respectively mounted on different mobile bodies, local data; generating, by each of the plurality of information processing apparatuses, a local model by performing machine learning of a global model using the collected local data; calculating, by each of the plurality of information processing apparatuses, an evaluation value according to an evaluation index; transmitting, by each of the plurality of information processing apparatuses, the calculated evaluation value to other information processing apparatuses respectively mounted on one or more other mobile bodies existing near its own mobile body by proximity communication; receiving, by each of the plurality of information processing apparatuses, from each of the other information processing apparatuses respectively mounted on the one or more other mobile bodies, the evaluation value calculated by the other information processing apparatus by the proximity communication; determining, by each of the plurality of information processing apparatuses, whether the calculated evaluation value has a high evaluation or not by comparing the calculated evaluation value and the evaluation values received from the other information processing apparatuses; and transmitting, by at least one of the information processing apparatuses that has determined that the calculated evaluation value has the high evaluation, local model information indicating the generated local model to a server apparatus.

There is a strong possibility that a plurality of information processing apparatuses respectively mounted on mobile bodies moving in geographically similar ranges collect mutually similar local data. Therefore, the capabilities of local models respectively generated by these information processing apparatuses are also mutually similar, and there is a strong possibility that it is sufficient to reflect at least one local model of at least one information processing apparatus on update of a global model. In the information processing method according to the first aspect of the present disclosure, the selection process is achieved by exchange of evaluation values among information processing apparatuses by proximity communication. According to the selection process by proximity communication, information processing apparatuses to participate in federated learning are selected from among a plurality of information processing apparatuses respectively mounted on mobile bodies existing in a geographically close range and local models generated by the selected information processing apparatuses can be reflected on update of a global model. Further, it is possible to select information processing apparatuses to participate in federated learning in an autonomous distributed manner (that is, each information processing apparatus can determine whether or not to participate in the federated learning by itself) without via a server apparatus. Therefore, according to the information processing method according to the first aspect of the present disclosure, it is possible to improve the efficiency of federated learning performed between a server apparatus and a plurality of information processing apparatuses respectively mounted in mobile bodies.

An embodiment according to one aspect of the present disclosure (hereinafter also referred to as "the present embodiment") will be described below based on drawings. The present embodiment described below, however, is a mere exemplification of the present disclosure in all respects. Various improvements or modifications may be made without departing from the scope of the present disclosure. In implementation of the present disclosure, a specific configuration according to an embodiment may be appropriately adopted. Data that appears in the present embodiment is described in a natural language in the present embodiment. However, more specifically, the data can be specified by a computer-recognizable pseudo language, commands, parameters, a machine language or the like.

1. Application Example

FIG. 1 schematically illustrates an example of a scenario to which the present disclosure is applied. A system according to the present embodiment is configured with a server apparatus 1 and a plurality of in-vehicle apparatuses 2.

The server apparatus 1 according to the present embodiment is one or more computers configured to acquire local models 50 from the in-vehicle apparatuses 2 and integrate the acquired local models 50. Each in-vehicle apparatus 2 is one or more computers configured to, by collecting local data 3 and performing machine learning of a global model 40 using the collected local data 3, generate a local model 50. The plurality of in-vehicle apparatuses 2 are respectively mounted in different vehicles V. In the example of FIG. 1, an in-vehicle apparatus 2A is mounted in a vehicle VA, and an in-vehicle apparatus 2B is mounted in a vehicle VB (in the description below, reference symbols A, B and the like will be attached when they are distinguished from one another, and the reference symbols will be omitted when they are not distinguished from one another). The vehicles V are, for example, cars. In the present embodiment, each vehicle V is an example of a mobile body, and each in-vehicle apparatus 2 is an example of an information processing apparatus mounted in the mobile body.

In the present embodiment, each in-vehicle apparatus 2 collects the local data 3. Each in-vehicle apparatus 2 generates the local model 50 by performing machine learning of the global model 40 using the collected local data 3. Performing machine learning using the local data 3 corresponds to performing localization for the apparatus itself. The global model 40 is a machine learning model before being localized by machine learning using the local data 3. The local model 50 is a trained machine learning model after being localized, which is generated by the global model 40 being updated by machine learning using the local data 3.

Each in-vehicle apparatus 2 calculates an evaluation value 6 according to an evaluation index 70. Each in-vehicle apparatus 2 transmits the calculated evaluation value 6 to other in-vehicle apparatuses 2 respectively mounted in one or more other vehicles V existing near its own vehicle V by proximity communication. Each in-vehicle apparatus 2 receives, from each of the other in-vehicle apparatuses 2 respectively mounted in the one or more other vehicles V existing near its own vehicle V, the evaluation value 6 calculated by the other in-vehicle apparatus 2 by proximity communication. Each in-vehicle apparatus 2 determines whether the calculated evaluation value 6 has a high evaluation or not by comparing the calculated evaluation value 6 and the evaluation values 6 received from the other in-vehicle apparatuses 2 of the one or more other vehicles V. At least one of the in-vehicle apparatuses 2 that has determined that the calculated evaluation value 6 has the high evaluation transmits local model information 500 indicating the generated local model 50 to the server apparatus 1.

In the example of FIG. 1, the vehicles VA and VB are assumed to exist in a range in which the in-vehicle apparatuses 2A and 2B can mutually transmit/receive data by proximity communication. In this example, the in-vehicle apparatus 2A collects local data 3A and generates a local model 50A using the collected local data 3A. The in-vehicle apparatus 2B collects local data 3B and generates a local model 50B using the collected local data 3B.

The in-vehicle apparatus 2A calculates an evaluation value 6A according to the evaluation index 70, and transmits the calculated evaluation value 6A to the other in-vehicle apparatus mounted in the other vehicle by proximity communication. By receiving it, the in-vehicle apparatus 2B acquires the evaluation value 6A of the in-vehicle apparatus 2A. Similarly, the in-vehicle apparatus 2B calculates an evaluation value 6B according to the evaluation index 70, and transmits the calculated evaluation value 6B to the other in-vehicle apparatus by proximity communication. By receiving it, the in-vehicle apparatus 2A acquires the evaluation value 6B of the in-vehicle apparatus 2B.

Each in-vehicle apparatus (2A, 2B) compares the evaluation value (6A, 6B) of the apparatus itself with the evaluation value (6B, 6A) of the other apparatus and determines whether the evaluation value (6A, 6B) has a high evaluation or not. In the example of FIG. 1, a scenario is assumed in which the in-vehicle apparatus 2A determines that the evaluation value (6A, 6B) of itself has a high evaluation, and the in-vehicle apparatus 2B determines that the evaluation value (6A, 6B) of itself has a low evaluation. In this scenario, the in-vehicle apparatus 2A between the two in-vehicle apparatuses (2A and 2B) transmits local model information 500A indicating the generated local model 50A to the server apparatus 1. The scenario illustrated in FIG. 1 is an exemplification, and the present disclosure is not limited to the example. The situation, such as the number of in-vehicle apparatuses 2 communicable with the server apparatus 1, the number of other in-vehicle apparatuses 2 existing in a range in which it is possible to transmit/receive data to/from a target in-vehicle apparatus 2 by proximity communication (that is, exchanging evaluation values 6 with the target in-vehicle apparatus 2 by proximity communication), and the in-vehicle apparatus 2 determining to have a high evaluation, may be appropriately identified according to a specific implementation scenario.

The server apparatus 1 receives the local model information 500 indicating the local model 50 from the at least one in-vehicle apparatus 2 among the plurality of in-vehicle apparatuses 2. The server apparatus 1 integrates the at least one local model 50 indicated by the local model information 500 received from the at least one in-vehicle apparatus 2. The server apparatus 1 thereby generates a new global model 45. The new global model 45 is a trained machine learning model generated by integrating the at least one local model 50 obtained from the at least one in-vehicle apparatus 2.

As described above, in the present embodiment, the selection process for selecting in-vehicle apparatuses 2 to participate in federated learning (to provide local models 50) is achieved by exchange of evaluation values 6 among the in-vehicle apparatuses 2 by proximity communication. According to the selection process by proximity communication, in-vehicle apparatuses 2 to participate in federated learning are selected from among a plurality of in-vehicle apparatuses 2 respectively mounted in vehicles V existing in a geographically close range, and local models 50 generated by the selected in-vehicle apparatuses 2 can be reflected on update of a global model 40. Further, it is possible to select the in-vehicle apparatuses 2 to participate in the federated learning in an autonomous distributed manner without via the server apparatus 1. Therefore, according to the present embodiment, it is possible to improve the efficiency of federated learning performed between the server apparatus 1 and the in-vehicle apparatuses 2. Additionally, since data exchanged among the in-vehicle apparatuses 2 is only the evaluation values 6, the privacy problem can be solved.

In the present embodiment, at least one of the global model 40 and the evaluation index 70 may be provided for each in-vehicle apparatus 2 from the server apparatus 1. The number of in-vehicle apparatuses 2 that may participate in federated learning need not be especially limited and may be appropriately decided according to each embodiment. The server apparatus 1 may provide the new global model 45 generated by integrating the local models 50 to each in-vehicle apparatus 2. After that, the new global model 45 may be treated as a global model 40, and generation and integration of local models 50 (generation of a further new global model) may be repeated. The system according to the present embodiment may generate a global model capable of accurately accomplishing an inference task by repeatedly executing the generation process and integration process for local models 50.

Each of the global models (40 and 45) and the local models 50 is configured to execute arithmetic processing for solving an inference task about a mobile body (in the present embodiment, a vehicle by a machine learning model. The machine learning model is provided with one or more arithmetic parameters for executing the arithmetic processing for solving the inference task. The machine learning model may be configured to solve a plurality of inference tasks. The machine learning model may be configured, for example, with a neural network, a regression model, a support vector machine or the like.

The inference task need not be especially limited if the inference task relates to a mobile body, and may be appropriately selected according to each embodiment. As one example, each mobile body may be provided with a sensor, and the inference task may be to derive some inference result from sensing data obtained by the sensor. The sensor may be, for example, an image sensor (such as a camera), a proximity sensor, a Lidar (light detection and ranging) sensor, a Radar (radio detection and ranging) or the like. As a specific example, the sensor may be an image sensor such as a camera, and the inference task may be to detect a target object (for example, a passerby, a signal, a central divider, or an obstacle) shown in an image obtained by the image sensor. In this case, to detect a target object may include to perform segmentation and to identify the target object. Additionally, the sensor may be an in-vehicle sensor such as an image sensor, a proximity sensor, a Lidar sensor or a Radar, and the inference task may be to decide the content of control of a mobile body (for example, braking a vehicle V, locking the door, or deciding the content of self-driving) from sensing data. If the inference task is to derive an inference result from sensing data, a sensor may be used to collect the local data 3.

The evaluation index 70 may be appropriately defined so that in-vehicle apparatuses 2 that generate local models 50 appropriate for update of the global model 40 (that is, such local models 50 that the performance of a new global model 45 generated by integration is better) are selected. The qualities of local data 3 influence the accuracy of the new global model 45 generated by integration. Further, since local models 50 can be created faster as the calculation capabilities of the in-vehicle apparatuses 2 are higher, the probability of success in uploading the local models 50 within the timeout is higher. Additionally, it is possible to shorten time required to aggregate the local models 50 to the server apparatus 1. Similarly, it is possible to shorten the time required to aggregate the local models 50 to the server apparatus 1 more as the communication capabilities of the in-vehicle apparatuses 2 are higher. Therefore, in the present embodiment, the evaluation index 70 may be configured to include at least any of a first index for evaluating the quality of local data 3, a second index for evaluating the calculation capability of each in-vehicle apparatus 2, and a third index for evaluating the communication capability of each in-vehicle apparatus 2. Further, the evaluation index 70 may be expressed by a function. In this case, each in-vehicle apparatus 2 may calculate the evaluation value by executing arithmetic processing of the function expressing the evaluation index 70.

The first index may be appropriately defined so as to make a higher evaluation as the local data 3 is expected to be more useful to improvement of the performance of the global model 40, and make a lower evaluation as the local data 3 is expected to be less useful to improvement of the performance. The first index may be expressed as a function ($f_1$). Whether the local data 3 is useful or not may be evaluated using the global model 40. As one example, an objective function used for machine learning of the global model 40 may be also used for evaluation of usefulness of the local data 3. The objective function may be read as a cost function, a loss function, or an error function. When an optimization problem in machine learning consists of minimization of the value of the objective function, a value calculated by the objective function is larger as the inference accuracy of the global model 40 for the local data 3 is lower. The inference accuracy being low corresponds to the local data 3 including many samples that are insufficiently trained for the global model 40. By reflecting local models 50 in which such samples have been trained on federated learning, the possibility that a new global model 45 with a good performance can be obtained is strong. Therefore, when an optimization problem in machine learning consists of minimization of the value of the objective function, the first index ($f_1$) may be defined so as to make a higher evaluation as an error calculated by the objective function by giving the local data 3 to the global model 40 is larger, and make a lower evaluation as the error is smaller. When whether the evaluation value is higher or lower directly corresponds to evaluation, the objective function may be simply used as the first index (the function $f_1$) as it is. In one example, the objective function may be the same in all the in-vehicle apparatuses 2. In another example, in at least a part of the in-vehicle apparatuses, the objective function may be different from the objective function for the other in-vehicle apparatuses 2. When the number of samples differs among the pieces of local data 3 collected by the in-vehicle apparatuses 2, an operation for enabling proper comparison may be performed, for example, by standardization or adjustment of the number of samples.

The second index may be appropriately defined so as to make a higher evaluation as the calculation capability is higher, and make a lower evaluation as the calculation capability is lower. The second index may be expressed as a function ($f_2$). The calculation capability may be calculated according to the performance of calculation resources such as processor resources and memory resources. The processor resources may include, for example, a CPU (central processing unit), a microprocessor, an FPGA (field-programmable gate array), a GPU (graphics processing unit) and the like. The memory resources may include, for example, storages (a hard disk drive, a solid state drive and the like), a RAM (random access memory), a cache memory (for example, a last level cache) and the like. The calculation capability may be evaluated, for example, based on the calculation speeds of the processor resources, the capacities of the memory resources, the memory resource reading speed and the like.

The third index may be appropriately defined so as to make a higher evaluation as the communication capability is higher, and make a lower evaluation as the communication capability is lower. The third index may be expressed as a function ($f_3$). The communication capability may be calculated according to the performance of a communication module that can be used for transmission of the local model 50. The communication capability may be evaluated, for example, based on the bandwidth of communication, the communication speed and the like.

$$S_k = \sum_n c_n f_n \qquad \text{(Formula 1)}$$

When the evaluation index 70 includes the first index, the second index and the third index, the evaluation index 70 may be configured with the function expression of Formula 1 above. Here, k indicates a target in-vehicle apparatus 2 (vehicle V), and $S_k$ is an evaluation value 6 calculated by the target in-vehicle apparatus 2. $c_n$ is a weight (priority) for each index. The value of $c_n$ may be appropriately set. In one example, the weight $c_n$ for each index may be set by specification by an operator. The expression of the functions ($f_1$, $f_2$, $f_3$) is an example, and order of the indexes need not be especially limited. The expressions of the functions may be appropriately decided according to each embodiment.

The relationship between the evaluation value 6 calculated by the evaluation index 70 and evaluation need not be especially limited, and may be appropriately decided according to each embodiment. In one example, the evaluation value 6 being high may correspond to evaluation being high. In another example, the evaluation value 6 being low may correspond to evaluation being low. Evaluation being high (low) corresponds to priority in participation in federated learning being high (low). Participating in federated learning corresponds to an in-vehicle apparatus 2 providing a local model 50 generated by the apparatus itself to the server apparatus 1 in order to generate a new global model 45.

Further, in one example, the server apparatus 1 and the in-vehicle apparatuses 2 may be configured to be mutually communicable (connectable) via a network as illustrated in FIG. 1. The type of the network need not be especially limited, and may be appropriately selected, for example, from among the Internet, a wireless communication network, a mobile communication network, a telephone network, a dedicated network and the like.

2. Configuration Example

[Hardware Configuration Example]
<Server Apparatus>

Figure 2:
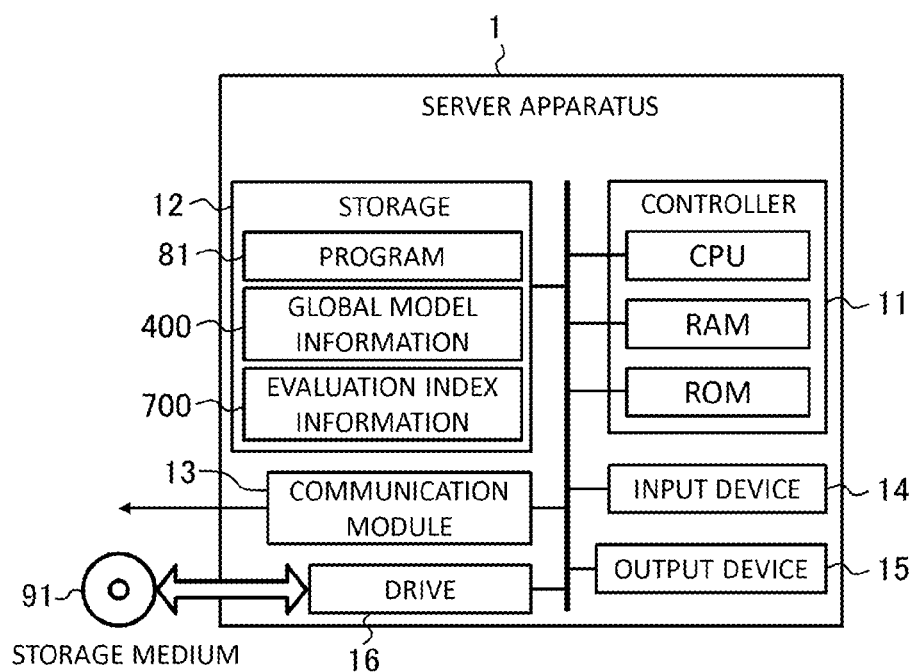
FIG. 2 schematically illustrates an example of a hardware configuration of a server apparatus according to an embodiment.

FIG. 2 schematically illustrates an example of a hardware configuration of the server apparatus 1 according to the present embodiment. As illustrated in FIG. 2, the server apparatus 1 according to the present embodiment is a computer in which a controller 11, a storage 12, a communication module 13, an input device 14, an output device 15 and a drive 16 are electrically connected.

The controller 11 includes a CPU, which is a hardware processor, a RAM, a ROM (read-only memory), a cache memory and the like and is configured to execute information processing based on a program and various kinds of data. The controller 11 (the CPU) is an example of a processor resource. The storage 12 is configured with a hard disk drive, a solid state drive or the like. The storage 12 is an example of a memory resource. In the present embodiment, the storage 12 stores various kinds of information such as a program 81, global model information 400 and evaluation index information 700.

Figure 7:
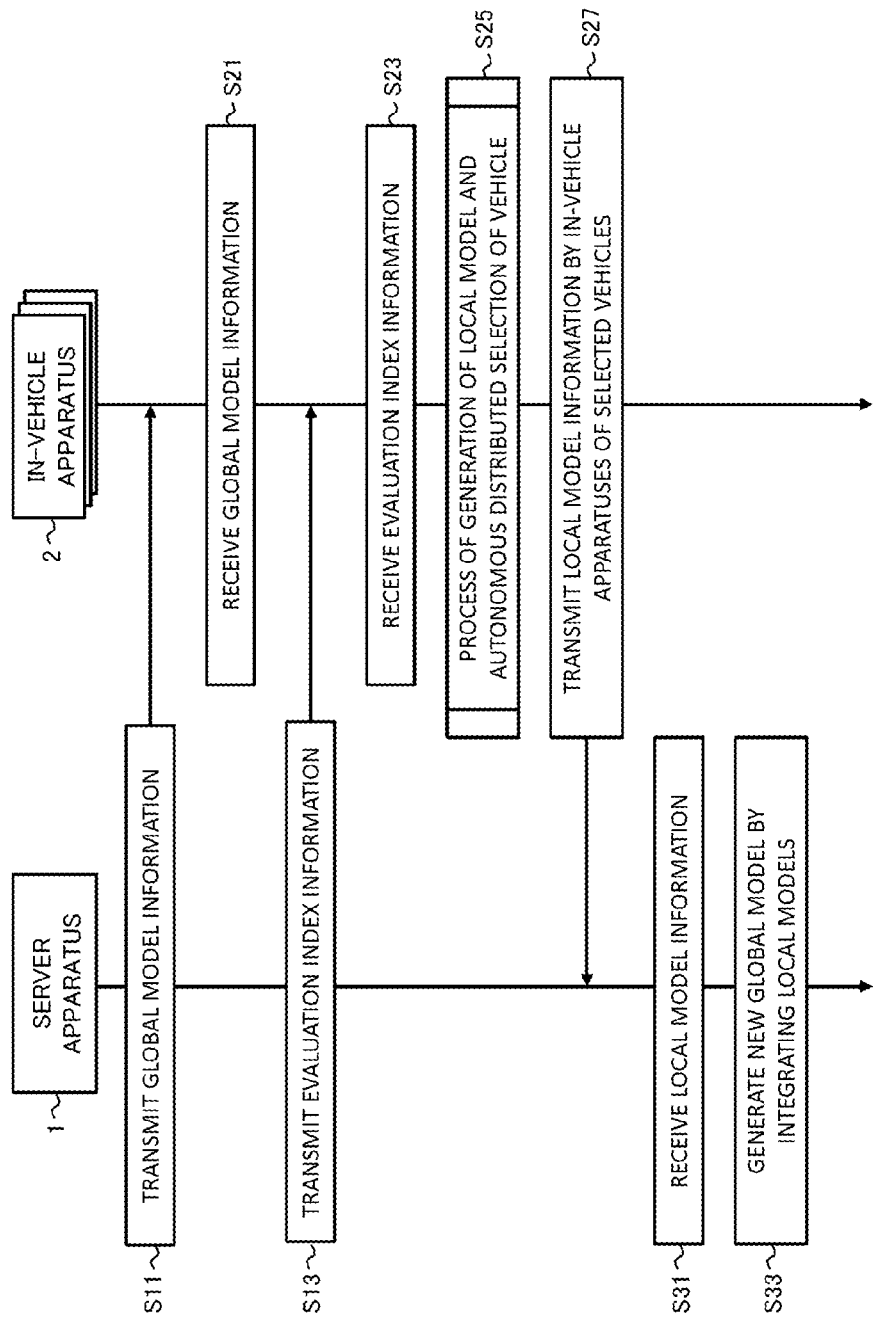
FIG. 7 is a sequence diagram illustrating an example of a processing process of federated learning executed between the server apparatus and the in-vehicle apparatuses according to the present embodiment.

The program 81 is a program for causing the server apparatus 1 to execute information processing related to federated learning (FIG. 7 described later). The program 81 also includes a series of instructions for the information processing. The global model information 400 is configured to indicate the global model 40. The evaluation index information 700 is configured to indicate the evaluation index 70.

The communication module 13 is, for example, a wired LAN (local area network) module, a wireless LAN module or the like and is configured to perform wired or wireless communication via a network. The server apparatus 1 may perform data communication with other computers (for example, the in-vehicle apparatuses 2) via the communication module 13.

The input device 14 is, for example, a device for performing input, such as a mouse and a keyboard. The output device 15 is, for example, a device for performing output, such as a display and a speaker. An operator can operate the server apparatus 1 by using the input device 14 and the output device 15. The input device 14 and the output device 15 may be integrally configured, for example, with a touch panel display.

The drive 16 is a device for reading various kinds of information such as a program stored in a storage medium 91. At least any of the program 81, the global model information 400 and the evaluation index information 700 may be stored in the storage medium 91. The storage medium 91 is a medium that accumulates various kinds of information such as a program electrically, magnetically, optically, mechanically or by chemical action in order that computers or other devices, machines and the like can read the stored information such as a program.

Here, in FIG. 2, a disc-type storage medium such as a CD or a DVD is exemplified as one example of the storage medium 91. However, the type of the storage medium 91 need not be limited to the disc-type. As a storage medium other than the disc-type storage medium, for example, a semiconductor memory such as a flash memory can be given. The type of the drive 16 may be appropriately selected according to the type of the storage medium 91.

As for a specific hardware configuration of the server apparatus 1, components can be appropriately omitted, replaced and added according to each embodiment. For example, the controller 11 may include a plurality of hardware processors. The hardware processors may be configured with a microprocessor, an FPGA, a GPU and the like. At least any of the input device 14, the output device 15 and the drive 16 may be omitted. The server apparatus 1 may be configured with a plurality of computers. In this case, the hardware configurations of the computers may be or may not be the same. The server apparatus 1 may be a computer designed specially for a provided service or may be a general-purpose computer or the like.

<In-Vehicle Apparatus>

Figure 3:
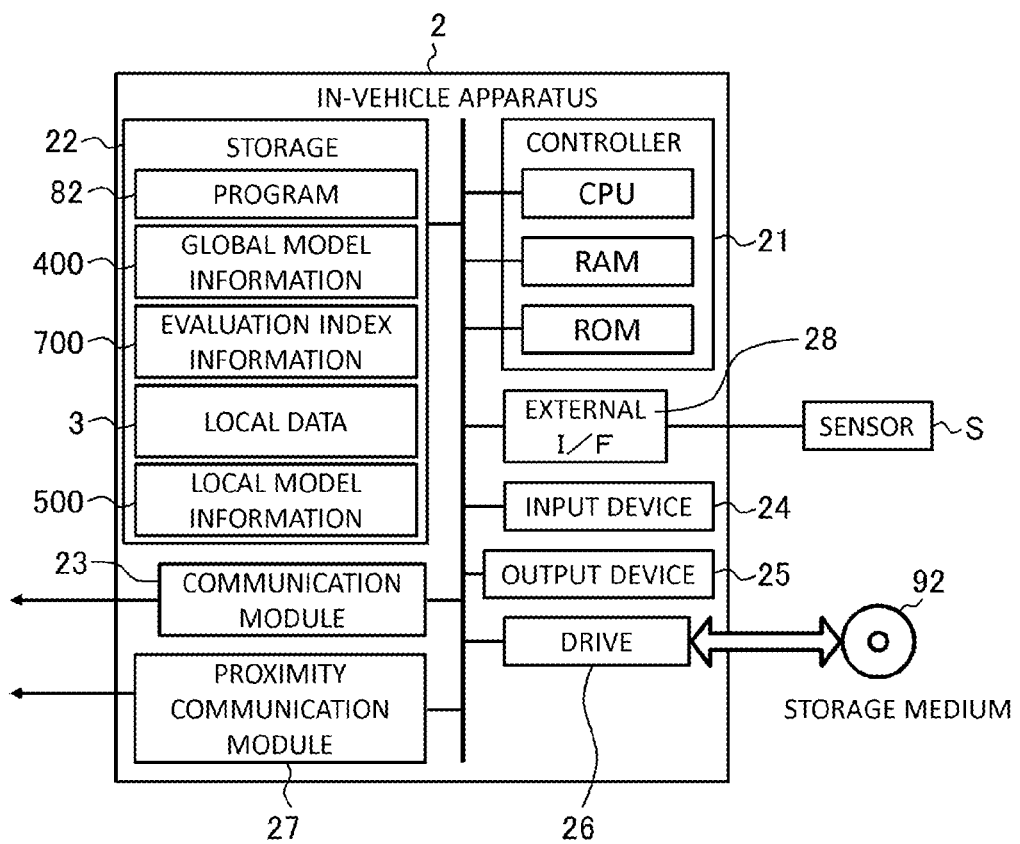
FIG. 3 schematically illustrates an example of a hardware configuration of an in-vehicle apparatus according to the embodiment.

FIG. 3 schematically illustrates an example of a hardware configuration of an in-vehicle apparatus 2 according to the present embodiment. As illustrated in FIG. 3, the in-vehicle apparatus 2 according to the present embodiment is a computer in which a controller 21, a storage 22, a communication module 23, an input device 24, an output device 25, a drive 26, a proximity communication module 27 and an external interface 28 are electrically connected.

The controller 21 includes a CPU, which is a hardware processor, a RAM, a ROM and the like and is configured to execute various kinds of information processing based on a program and data. The controller 21 (the CPU) is an example of a processor resource. The storage 22 is an example of a memory resource and is configured, for example, with a hard disk drive or a solid state drive. In the present embodiment, the storage 22 stores various kinds of information such as a program 82, the global model information 400, the evaluation index information 700, the local data 3 and the local model information 500.

Figure 8:
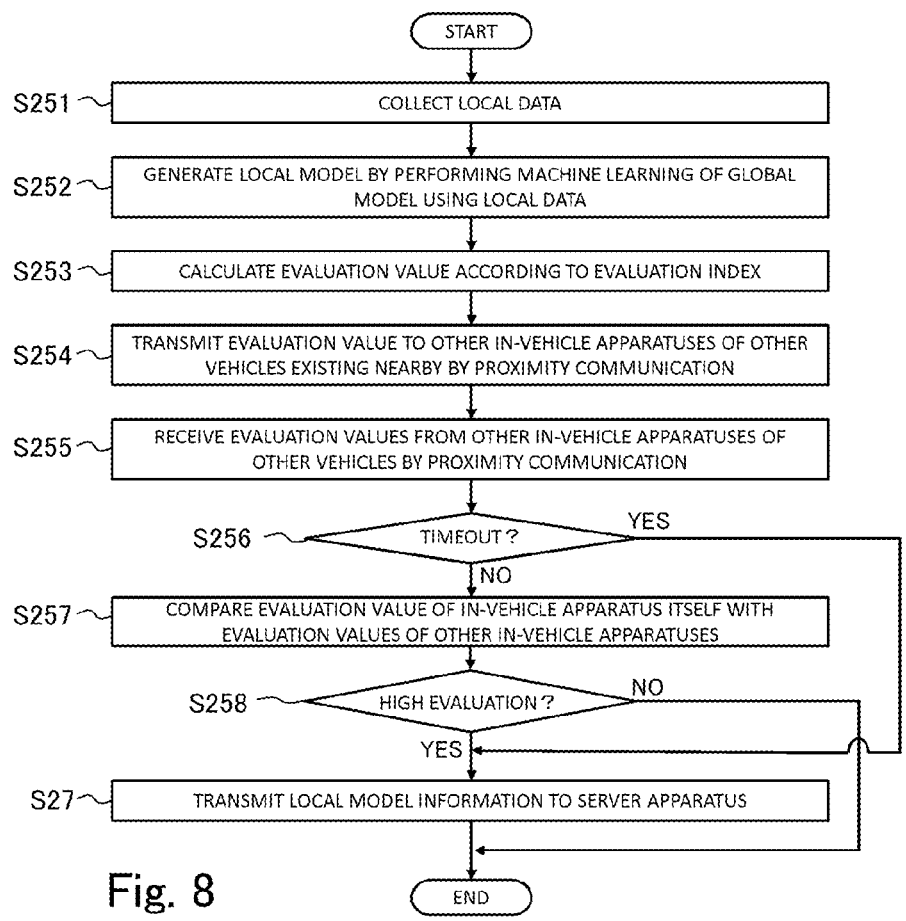
FIG. 8 is a flowchart illustrating an example of a processing procedure for generation and autonomous distributed selection of a local model by the in-vehicle apparatuses according to the embodiment.

The program 82 is a program for causing the in-vehicle apparatus 2 to execute information processing related to federated learning (FIGS. 7 and 8 described later). The program 82 also includes a series of instructions for the information processing. The local model information 500 is configured to indicate information about a generated local model 50.

The communication module 23 is, for example, a wireless LAN module or the like and is configured to perform wireless communication via a network. The in-vehicle apparatus 2 may perform data communication with other computers (for example, the server apparatus 1) via the communication module 23. The input device 24 and the output device 25 may be configured similarly to the input device 14 and the output device 15. An operator (for example, a driver of the vehicle can operate the in-vehicle apparatus 2 by using the input device 24 and the output device 25.

The drive 26 and a storage medium 92 may be configured similarly to the drive 16 and the storage medium 91. At least any of the program 82, the global model information 400, the evaluation index information 700, the local data 3 and the local model information 500 described above may be stored in the storage medium 92.

The proximity communication module 27 is configured to be capable of executing data transmission/reception by proximity communication. In one example, the proximity communication module 27 may be a beacon module. The type of the beacon module may be appropriately selected according to each embodiment. A publicly known type of beacon module may be adopted as the proximity communication module 27. In the present embodiment, the proximity communication module 27 is used to perform proximity communication with in-vehicle apparatuses 2 other than its own apparatus. However, the purpose of use of the proximity communication module 27 is not limited thereto. The proximity communication module 27 may be used for other purposes. Further, the type of the proximity communication module 27 is not limited to a beacon module. In another example, the proximity communication module 27 may be configured to be capable of executing proximity communication such as Wi-Fi (registered trademark), Bluetooth (registered trademark), D2D or the like.

The external interface 28 is, for example, a USB (universal serial bus) port, a dedicated port or the like and is an interface for connecting to an external apparatus. The types and the number of external interfaces 28 may be appropriately decided according to the types and the number of external apparatuses to be connected. In the present embodiment, the in-vehicle apparatus 2 may be connected to a sensor S via the external interface 28. The sensor S may be, for example, an image sensor (a camera or the like), a proximity sensor, a Lidar (light detection and ranging) sensor, a Radar or the like. The inference task accomplished by the global model (40, 45) and the local model 50 may be to derive an inference result from sensing data obtained by the sensor S. In this case, the sensor S may be used to collect the local data 3.

As for a specific hardware configuration of the in-vehicle apparatus 2, components can be appropriately omitted, replaced and added according to each embodiment. For example, the controller 21 may include a plurality of hardware processors. The hardware processors may be configured with a microprocessor, an FPGA, a GPU and the like. At least any of the input device 24, the output device 25, the drive 26 and the external interface 28 may be omitted. The in-vehicle apparatus 2 may be configured with a plurality of computers. In this case, the hardware configurations of the computers may be or may not be the same. The in-vehicle apparatus 2 may be a computer designed specially for a provided service or may be a general-purpose computer, a mobile phone including a smartphone, a tablet PC (personal computer) or the like.

[Software Configuration Example]
<Server Apparatus>

Figure 4:
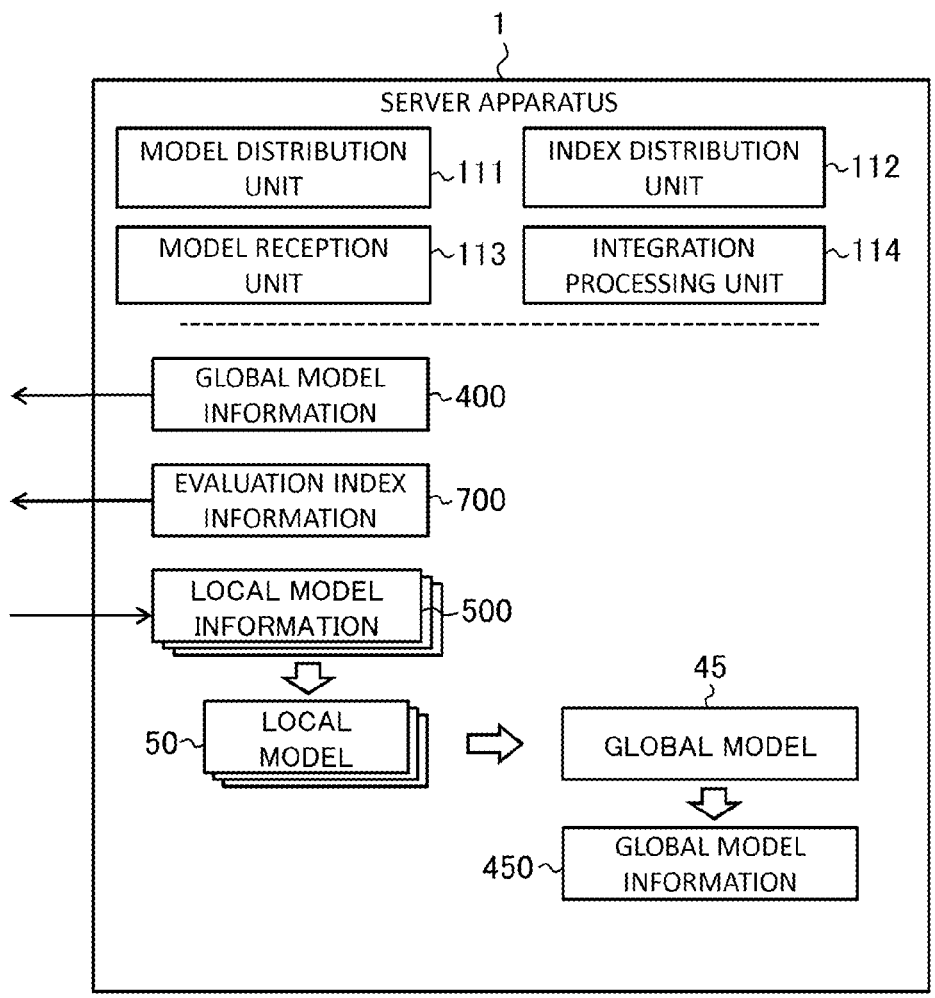
FIG. 4 schematically illustrates an example of a software configuration of the server apparatus according to the embodiment.

FIG. 4 schematically illustrates an example of a software configuration of the server apparatus 1 according to the present embodiment. The controller 11 of the server apparatus 1 develops the program 81 stored in the storage 12 on the RAM. Then, the controller 11 executes the instructions included in the program 81 developed on the RAM, by the CPU. Thereby, as illustrated in FIG. 4, the server apparatus 1 according to the present embodiment operates as a computer provided with a model distribution unit 111, an index distribution unit 112, a model reception unit 113 and an integration processing unit 114 as software modules. That is, in the present embodiment, each software module of the server apparatus 1 is realized by the controller 11 (the CPU).

The model distribution unit 111 is configured to transmit the global model information 400 indicating the global model 40 to each of the plurality of in-vehicle apparatuses 2. The index distribution unit 112 is configured to transmit the evaluation index information 700 indicating the evaluation index 70 to each of the plurality of in-vehicle apparatuses 2. In the present embodiment, the global model 40 and the evaluation index 70 are distributed to the in-vehicle apparatuses 2 from the server apparatus 1 by operations of the model distribution unit 111 and the index distribution unit 112.

The model reception unit 113 is configured to receive local model information 500 indicating a local model 50 from at least one in-vehicle apparatus 2 among the plurality of in-vehicle apparatuses 2. Each of the at least one in-vehicle apparatus 2 is an in-vehicle apparatus 2 that has determined to have a high evaluation as a result of the selection process with evaluation values 6. The selection process includes exchanging the evaluation values 6 between each in-vehicle apparatus itself and the other in-vehicle apparatuses 2 by proximity communication, and comparing the evaluation value 6 of the apparatus itself and the evaluation values 6 of the other in-vehicle apparatuses 2.

The integration processing unit 114 is configured to generate a new global model 45 by integrating the at least one local model 50 indicated by the local model information 500 received from the at least one in-vehicle apparatus 2. The integration processing unit 114 may be further configured to generate global model information 450 indicating the new global model 45 and store the generated global model information 450 into a predetermined storage area (for example, the RAM of the controller 11, the storage 12, the storage medium 91 or an external storage device).

<In-Vehicle Apparatus>

Figure 5:
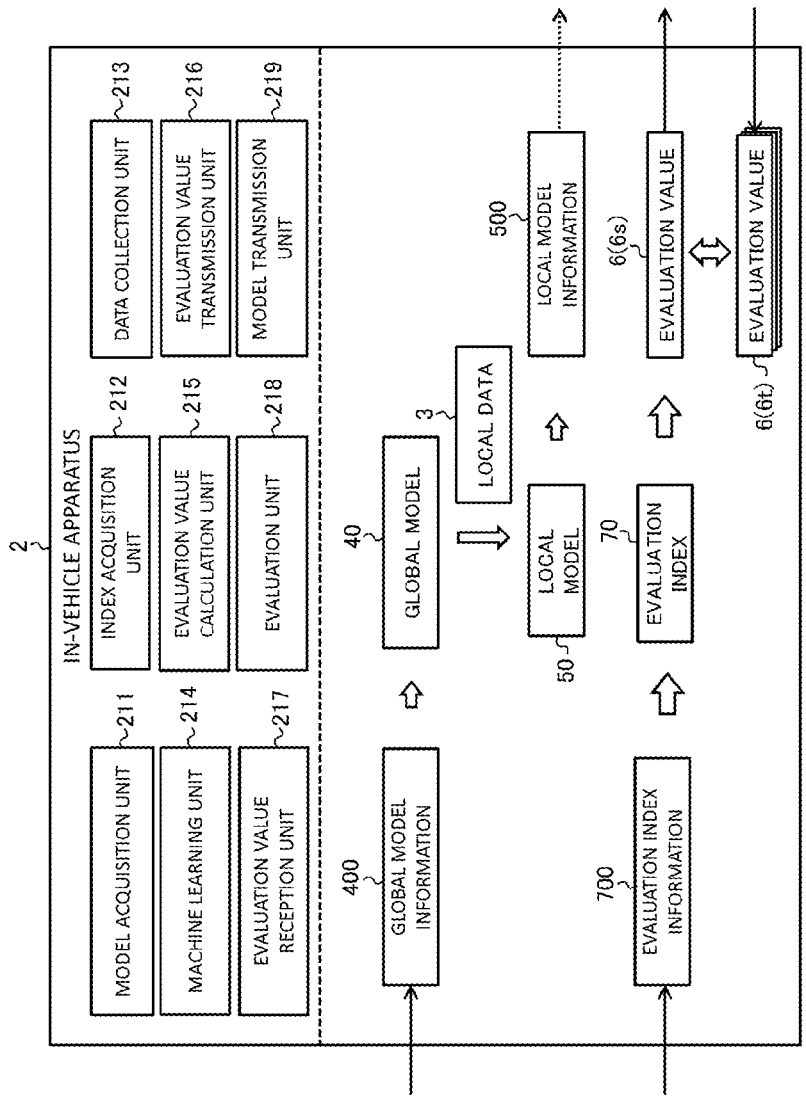
FIG. 5 schematically illustrates an example of a software configuration of the in-vehicle apparatus according to the embodiment.

FIG. 5 schematically illustrates an example of a software configuration of the in-vehicle apparatus 2 according to the present embodiment. The controller 21 of the in-vehicle apparatus 2 develops the program 82 stored in the storage 22 on the RAM. Then, the controller 21 executes the instructions included in the program 82 developed on the RAM, by the CPU. Thereby, as illustrated in FIG. 5, the in-vehicle apparatus 2 according to the present embodiment operates as a computer provided with a model acquisition unit 211, an index acquisition unit 212, a data collection unit 213, a machine learning unit 214, an evaluation value calculation unit 215, an evaluation value transmission unit 216, an evaluation value reception unit 217, an evaluation unit 218 and a model transmission unit 219 as software modules. That is, in the present embodiment, each software module of the in-vehicle apparatus 2 is also realized by the controller 21 (the CPU) similarly to the server apparatus 1.

The model acquisition unit 211 is configured to acquire the global model information 400 indicating the global model 40. In the present embodiment, the model acquisition unit 211 is configured to receive the global model information 400 distributed from the server apparatus 1. The index acquisition unit 212 is configured to acquire the evaluation index information 700 indicating the evaluation index 70. In the present embodiment, the index acquisition unit 212 is configured to receive the evaluation index information 700 distributed from the server apparatus 1.

The data collection unit 213 is configured to collect the local data 3. The machine learning unit 214 is configured to generate the local model 50 by performing machine learning of the global model 40 using the collected local data 3. The machine learning unit 214 may be further configured to generate the local model information 500 indicating the local model 50 and store the generated local model information 500 into a predetermined storage area (for example, the RAM of the controller 21, the storage 22, the storage medium 92 or an external storage device).

The evaluation value calculation unit 215 is configured to calculate an evaluation value 6 ($6s$) according to the evaluation index 70 indicated by the acquired evaluation index information 700. The evaluation value transmission unit 216 is configured to transmit the calculated evaluation value 6 ($6s$) to other in-vehicle apparatuses 2 respectively mounted in one or more other vehicles V existing near its own vehicle V by proximity communication. The evaluation value reception unit 217 is configured to receive, from each of the other in-vehicle apparatuses 2 respectively mounted in the one or more other vehicles V, an evaluation value 6 ($6t$) calculated by the other in-vehicle apparatus 2 according to the evaluation index 70 by proximity communication. In description below, the reference sign "$6s$" may be attached to an evaluation value of an in-vehicle apparatus 2 itself (a target in-vehicle apparatus 2), and the reference sign "$6t$" may be attached to evaluation values of other in-vehicle apparatus 2 seen from the target in-vehicle apparatus 2.

The evaluation unit 218 is configured to determine whether the calculated evaluation value $6s$ has a high evaluation or not by comparing the calculated evaluation value $6s$ with the evaluation values $6t$ received from the other in-vehicle apparatuses 2. The model transmission unit 219 is configured to, when determining that the calculated evaluation value $6s$ of its own in-vehicle apparatuses 2 has a high evaluation, transmit the local model information 500 indicating the generated local model 50 to the server apparatus 1.

(Example of Machine Learning Method)

Figure 6:
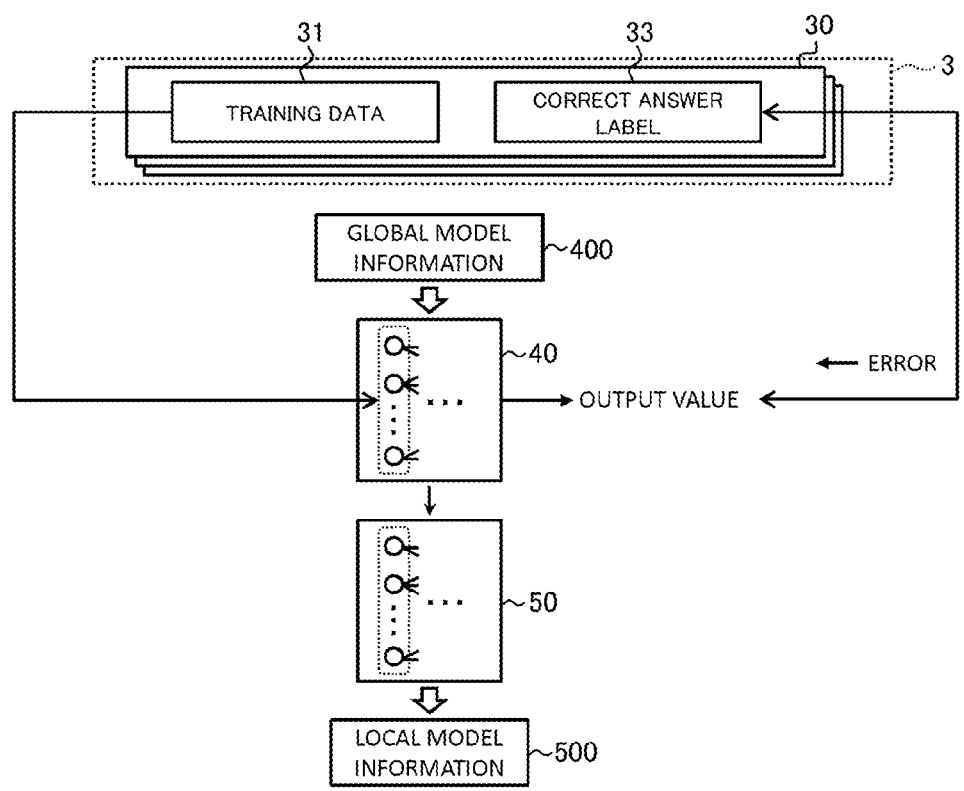
FIG. 6 schematically illustrates an example of a process of machine learning in the in-vehicle apparatus.

FIG. 6 schematically illustrates an example of a processing process of machine learning of the global model 40 by the machine learning unit 214. Each of the global model (40, 45) and the local model 50 is configured with a machine learning model. The machine learning model is provided with one or more arithmetic parameters for executing arithmetic processing for solving an inference task, the values of the one or more arithmetic parameters being adjusted by machine learning. If it is possible to execute arithmetic operation for solving an inference task about a mobile body, the type, configuration and structure of the machine learning model need not be especially limited and may be appropriately decided according to each embodiment.

FIG. 6 illustrates an example of a scenario in which a neural network is adopted as a machine learning model constituting the global model 40, and supervised learning is adopted as a machine learning method, as a typical example. In this case, a weight of connection between nodes (neurons), a threshold for each node and the like are examples of the arithmetic parameter. The type and structure (for example, the type of each layer, the number of layers, the number of nodes of each layer, connection relationships among nodes and the like) of the neural network may be appropriately decided according to each embodiment. The global model 40 may be configured, for example, with a fully connected neural network, a convolutional neural network, a recurrent neural network, a combination thereof or the like.

In the one example of FIG. 6, the local data 3 is configured with a plurality of datasets 30. Each dataset 30 is configured with a combination of training data 31 and a correct answer label 33, and is used as a sample of a training target in machine learning. The training data 31 is a sample of an explanatory variable, and is input to a machine learning model in machine learning. When the inference task is to derive an inference result from sensing data, the training data 31 may be configured with sensing data obtained by the sensor S. The correct answer label 33 is configured so as to indicate a true value of an objective variable for a sample of an input explanatory variable, that is, a solution (a true value) of the inference task for corresponding training data 31. In machine learning, the training data 31 is used as input data, and the correct answer label 33 is used as a teacher signal.

The training data 31 may be appropriately collected. In one example, the controller 21 of each in-vehicle apparatus 2 may collect the training data 31 as the data collection unit 213 while operating accomplishment of the inference task by the global model 40. In this case, the controller 21 may preferentially collect input data from which the global model 40 has derived a wrong inference result, as the training data 31. When, in the case of repeatedly executing the process of federated learning, the local model 50 has been tentatively generated by the past process, the controller 21 may collect the training data 31 while operating accomplishment of the inference task by the local model 50. In comparison, the correct answer label 33 may be appropriately obtained so as to indicate a correct answer to an inference for the obtained training data 31. In one example, the correct answer label 33 may be obtained by input by an operator. In another example, the correct answer label 33 may be acquired by an arbitrary inference process. The correct answer label 33 may be acquired based on information obtained from another sensor. Each dataset 30 may be automatically generated by an operation of a computer or may be manually generated by an operation of an operator being at least partially included.

The machine learning unit 214 performs initial setting of the global model 40 referring to the global model information 400, as a process of machine learning. When information about the global model 40 is already developed, this process may be omitted. Next, for each dataset 30, the machine learning unit 214 trains the global model 40 so that an output value (an inference result) obtained from the global model 40 by giving the training data 31 matches a true value indicated by the correct answer label 33. Training the global model 40 is configured with performing adjustment (optimization) of values of arithmetic parameters constituting the global model 40. A method for adjusting the arithmetic parameters (a method for solving an optimization problem) may be appropriately decided according to the type, configuration, structure and the like of a machine learning model adopted as the global model 40.

As one example of the adjustment method, when the global model 40 is configured with a neural network, the machine learning unit 214 inputs the training data 31 of each dataset 30 to the global model 40 and executes a forward-propagating arithmetic processing of the global model 40. As a result of the arithmetic processing, the machine learning unit 214 acquires an output value corresponding to an inference result for the training data 31 from the global model 40. The machine learning unit 214 calculates an error between the obtained output value and a true value indicated by a corresponding correct answer label 33, and further calculates a gradient of the calculated error. The machine learning unit 214 calculates errors of the values of the arithmetic parameters of the global model 40 by back-propagating the calculated error gradient by error back-propagation. The machine learning unit 214 updates the values of the arithmetic parameters based on the calculated errors.

By the series of update processes, the machine learning unit 214 adjusts the values of the arithmetic parameters of the global model 40 so that the sum of errors between the output values (the inference results) obtained by giving the training data 31 and true values indicated by the correct answer labels 33 is reduced. The adjustment of the arithmetic parameters may be repeated until a predetermined condition, such as the adjustment having been executed a set number of times of repetition or the sum of the calculated errors becoming equal to or below a threshold, is satisfied. Further, for example, an objective function for calculating the errors (a cost function, a loss function or an error function) and conditions for machine learning, such as a learning rate, may be appropriately set according to each embodiment. The local model 50 can be generated by the process of machine learning. The machine learning unit 214 generates the local model information 500 indicating the local model 50.

The method for machine learning need not be limited to the supervised learning illustrated in FIG. 6. In another example, unsupervised learning (including adversarial learning) or reinforcement learning may be adopted as the method for machine learning. The configuration of the local data 3 may be appropriately decided according to an adopted method for machine learning, the type of a machine learning model and the like. Further, a machine learning model constituting the global model 40 need not be limited to a neural network. In another example, the global model 40 may be configured with a regression model, a support vector machine or the like.

<Others>

In the present embodiment, an example is described in which, for the server apparatus 1 and each in-vehicle apparatus 2, all the software modules are realized by the general-purpose CPU. However, a part or all of the software modules may be realized by one or more dedicated processors. Each of the modules may be realized as a hardware module. As for the software configurations of the server apparatus 1 and each in-vehicle apparatus 2, modules may be appropriately omitted, replaced and added according to each embodiment.

3. Operation Example

FIG. 7 is a sequence diagram illustrating an example of a processing process of federated learning executed between the server apparatus 1 and the in-vehicle apparatuses 2 according to the present embodiment. The processing procedure below is an example of an information processing method. However, the processing procedure below is a mere example, and each step may be changed as far as possible. Further, as for the processing procedure below, steps can be appropriately omitted, replaced and added according to each embodiment.

<Steps S11 and S21>

At step S11, the controller 11 of the server apparatus 1 operates as the model distribution unit 111, and transmits the global model information 400 indicating the global model 40 to each in-vehicle apparatus 2 using the communication module 13.

A range of and a method for the transmission may be appropriately selected according to each embodiment. As one example, the controller 11 may transmit the global model information 400 (the global model 40) to each in-vehicle apparatus 2 by broadcast. Thereby, the bandwidth of wireless communication can be saved. Further, a geographic range for integrating local models 50 may be arbitrarily defined, and a global model 40 to be distributed may be selected for each defined range. In this case, a global model 40 distributed to a part may be different from a global model 40 distributed to other parts. In the case of adopting broadcast as a method for distributing the global model 40, the geographic range may be defined according to the range of broadcast.

The global model 40 may be an untrained machine learning model or may be a trained machine learning model. If the global model 40 is a trained machine learning model, the global model 40 may be a model that is generated by machine learning by the server apparatus 1 or may be a model generated by an integration process by prior federated learning (for example, a case where, after completion of an integration process at step S33 described later, the process is executed again from step S11 with a new global model 45 as the global model 40).

If the server apparatus 1 generates the global model 40 by performing machine learning, the controller 11 may acquire global data. The global data may be configured similarly to the local data 3. The global data may be collected, for example, by data generation in an experimental environment, provision from the in-vehicle apparatuses 2 or the like. Then, the controller 11 may generate the global model 40 by performing machine learning using the obtained global data. A method for machine learning for generating the global model 40 may be similar to the method for machine learning for generating the local model 50. In one example, similarly to the example of FIG. 6, the global data may be configured with a plurality of datasets each of which includes a combination of training data and a correct answer label, and the global model 40 may be generated by supervised learning.

If it is possible to reproduce the global model 40, the configuration of the global model information 400 need not be especially limited, and may be appropriately decided according to each embodiment. In one example, the global model information 400 may include information indicating the values of the arithmetic parameters included in the global model 40. In some cases, the global model information 400 may further include information indicating the structure of the global model 40. The structure may be identified, for example, by the number of layers from an input layer to an output layer, the type of each layer, the number of neurons included in each layer, connection relationships between neurons of adjacent layers, and the like.

At step S21, in response to the process of step S11, the controller 21 of each in-vehicle apparatus 2 operates as the model acquisition unit 211 and receives the global model information 400 from the server apparatus 1 using the communication module 23. Thereby, each in-vehicle apparatus 2 acquires the global model 40.

<Steps S13 and S23>

At step S13, the controller 11 of the server apparatus 1 operates as the index distribution unit 112, and transmits the evaluation index information 700 indicating the evaluation index 70 to each in-vehicle apparatus 2 using the communication module 13.

Similarly to step S11, a range of and a method for the transmission may be appropriately selected according to each embodiment. As one example, the controller 11 may transmit the evaluation index information 700 to each in-vehicle apparatus 2 by broadcast. Thereby, the bandwidth of wireless communication can be saved. Further, the evaluation index 70 to be distributed may be selected for each geographic range. In this case, an evaluation index 70 distributed to a part may be different from an evaluation index 70 distributed to other parts. In the case of adopting broadcast as a method for distributing the evaluation index information 700, the geographic range may be defined according to the range of broadcast.

If it is possible to identify the evaluation index 70 and calculate the evaluation value 6, the configuration of the evaluation index information 700 need not be especially limited, and may be appropriately decided according to each embodiment. In one example, the evaluation index information 700 may be configured to indicate the relational expression of Formula 1 above. In another example, when the function of each index is shared among the in-vehicle apparatuses 2 in advance, the evaluation index information 700 may be configured to indicate a weight $c_n$ for each index (information about the function of each index may be omitted). In this case, the weight $c_n$ for each index may be appropriately set for each geographic range, and the controller 11 may transmit the weight $c_n$ for each index to each in-vehicle apparatus 2 as the evaluation index information 700 by broadcast.

At step S23, in response to the process of step S13, the controller 21 of each in-vehicle apparatus 2 operates as the index acquisition unit 212 and acquires the evaluation index information 700 from the server apparatus 1 using the communication module 23. Thereby, each in-vehicle apparatus 2 acquires the evaluation index 70.

<Step S25>

At step S25, the controller 21 of each in-vehicle apparatus 2 executes a process of generation of the local model 50 and autonomous distributed selection of vehicles V.

FIG. 8 is a flowchart illustrating an example of a processing procedure for the process of generation and the autonomous distributed selection process of the local model 50 by the in-vehicle apparatuses 2 according to the present embodiment. The process of step S25 according to the present embodiment may include the processes of steps S251 to S258 below. However, the processing procedure illustrated in FIG. 8 is a mere example, and each process may be changed as far as possible. Further, as for the processing procedure illustrated in FIG. 8, steps can be appropriately omitted, replaced and added according to each embodiment.

(Steps S251 and S252)

At step S251, the controller 21 of each in-vehicle apparatus 2 operates as the data collection unit 213, and collects the local data 3. At step S252, the controller 21 of each in-vehicle apparatus 2 operates as the machine learning unit 214, and generates the local model 50 by performing machine learning of the global model 40 received, using the collected local data 3. In one example, as illustrated in FIG. 6, the local data 3 may be configured with a plurality of datasets 30 each of which includes a combination of the training data 31 and the correct answer label 33, and the local model 50 may be generated by supervised learning.

After the machine learning is completed, the controller 21 of each in-vehicle apparatus 2 generates the local model information 500 indicating the local model 50. If it is possible to reproduce the local model 50, the configuration of the local model information 500 need not be especially limited, and may be appropriately decided according to each embodiment. In one example, similarly to the global model information 400, the local model information 500 may include information indicating the values of the arithmetic parameters adjusted by machine learning and included in the local model 50. In some cases, the local model information 500 may further include information indicating the structure of the local model 50. In another example, the local model information 500 may be configured to indicate update from the global model 40 to the local model 50 (that is, differences in the values of the arithmetic parameters between the global model 40 and the local model 50).

After generating the local model 50, each in-vehicle apparatus 2 may hold the global model information 400 as it is or may delete the global model information 400 (for example, may rewrite the global model information 400 with the local model information 500). Further, the generated local model 50 may be used to solve the inference task at an arbitrary timing in each in-vehicle apparatus 2. After the machine learning is completed, the controller 21 of each in-vehicle apparatus 2 advances the process to next step S253.

(Step S253)

At step S253, the controller 21 of each in-vehicle apparatus 2 operates as the evaluation value calculation unit 215, and calculates the evaluation value 6s of its own apparatus according to the evaluation index 70 indicated by the evaluation index information 700 received. In the present embodiment, the evaluation index 70 may include at least any of the first, second and third indexes described above. Further, the evaluation index 70 may be expressed by a function. Accordingly, the controller 21 of each in-vehicle apparatus 2 may calculate the evaluation value 6s of its own apparatus by executing arithmetic processing of the function expressing the evaluation index 70 (for example, Formula 1 above). When calculating the evaluation value 6s of its own apparatus, the controller 21 advances the process to next step S254.

(Steps S254 to S256)

At step S254, the controller 21 of each in-vehicle apparatus 2 operates as the evaluation value transmission unit 216, and transmits the calculated evaluation value 6s of its own apparatus to other in-vehicle apparatuses 2 respectively mounted in one or more other vehicles V existing near its own vehicle V by proximity communication. At step S255, the controller 21 of each in-vehicle apparatus 2 operates as the evaluation value reception unit 217, and receives, from each of the other in-vehicle apparatuses 2 respectively mounted in the one or more other vehicles V, the evaluation value 6t calculated by the other in-vehicle apparatus 2 according to the evaluation index 70.

The timings of executing the processes of steps S254 and S255 may be adjusted by an arbitrary method among the in-vehicle apparatuses 2. In one example, a time zone for executing a trial of the transmission of the evaluation value 6s at step S254 and the reception of the evaluation values 6t at step S255 may be decided in advance. In this case, information about the time zone for the execution may be shared among the in-vehicle apparatuses 2.

For the proximity communication at steps S254 and S255, the proximity communication module 27 is used. In the present embodiment, each in-vehicle apparatus 2 may be provided with a beacon module as the proximity communication module 27. Accordingly, the controller 21 may perform proximity communication using the beacon module. Thereby, proximity communication can be inexpensively performed. The transmission range of the evaluation value 6s may be appropriately decided according to the type and the like of the proximity communication module 27.

Further, a method for the transmission may be appropriately selected according to each embodiment. In one example, the controller 21 of each in-vehicle apparatus 2 may transmit the evaluation value 6s by broadcast in the proximity communication at step S254. At step S255, the controller 21 of each in-vehicle apparatus 2 may try acquisition of the evaluation values 6t from the other in-vehicle apparatuses 2 by listening to broadcast from the other in-vehicle apparatuses 2. Thereby, the bandwidth of proximity communication can be saved.

At step S256, the controller 21 of each in-vehicle apparatus 2 determines whether or not the evaluation values 6t have been obtained from the other in-vehicle apparatuses 2 within a predetermined period. Not obtaining the evaluation values 6t from the other in-vehicle apparatuses 2 within the predetermined period corresponds to the other in-vehicle apparatuses 2 (the other vehicles not existing in the range in which proximity communication is possible, during the predetermined period. The information processing method according to the present embodiment is configured so as to cause such in-vehicle apparatuses 2 to participate in federated learning. That is, if the evaluation values 6t have not been obtained from the other in-vehicle apparatuses 2 within the predetermined period (if the timeout comes), the controller 21 advances the process to step S27. On the other hand, if the evaluation values 6t have been obtained from the other in-vehicle apparatuses 2 mounted in the other one or more vehicles V, the controller 21 advances the process to step S257.

(Steps S257 and S258)

At step S257, the controller 21 operates as the evaluation unit 218, and determines whether the calculated evaluation value 6s of its own apparatus has a high evaluation or not by comparing the calculated evaluation value 6s with the evaluation values 6t received from the other in-vehicle apparatuses 2.

A range in which the calculated evaluation value 6s is determined to have a high evaluation may be appropriately decided according to each embodiment. In one example, the controller 21 may determine that the calculated evaluation value 6s has a high evaluation if the calculated evaluation value 6s has the highest evaluation as a result of the comparison of the evaluation values (6s and 6t), and, otherwise, determine that the calculated evaluation value 6s do not have the high evaluation. In another example, the controller 21 may determine that the calculated evaluation value 6s has a high evaluation if the calculated evaluation value 6s has an arbitrary rank of evaluation from the highest as a result of the comparison of the evaluation values (6s and 6t), and, otherwise, determine that the calculated evaluation value 6s do not have the high evaluation.

At step S258, the controller 21 decides a branch destination of the process according to the result of the comparison at step S257. If determining that the calculated evaluation value 6s has the high evaluation, the controller 21 advances the process to step S27. On the other hand, if determining that the calculated evaluation value 6s do not have the high evaluation, the controller 21 of the in-vehicle apparatus 2 omits the process of step S27, and ends the processing procedure according to the present operation example.

<Step S27>

At step S27, the controller 21 operates as the model transmission unit 219, and transmits the local model information 500 indicating the local model 50 generated by its own apparatus to the server apparatus 1 using the communication module 23. In the present embodiment, the process of step S27 is executed by an in-vehicle apparatus 2 that has not obtained the evaluation values 6t from the other in-vehicle apparatuses 2 within the predetermined period in the process of step S256, and at least one in-vehicle apparatus 2 that has determined to have the high evaluation as a result of the comparison of step S257. When the transmission of the local model information 500 is completed, the controller 21 of each of the in-vehicle apparatuses 2 ends the processing procedure according to the operation example.

<Step S31>

Returning to FIG. 7, at step S31, the controller 11 of the server apparatus 1 operates as the model reception unit 113, and receives the local model information 500 indicating the local model 50 from the at least one in-vehicle apparatus 2 that has executed the process of step S27. When receiving the local model information 500, the controller 11 advances the process to next step S33.

<Step S33>

At step S33, the controller 11 operates as the integration processing unit 114, and generates a new global model 45 by integrating the at least one local model 50 indicated by the local model information 500 received from the at least one in-vehicle apparatus 2. Integrating the plurality of local models 50 may be averaging the values of corresponding arithmetic parameters included in the local models 50, summing up the values of corresponding arithmetic parameters, or the like. The values of the arithmetic parameters included in each local model 50 may be integrated after being weighted. The weight for each local model 50 may be specified by an arbitrary method.

The integration of the local models 50 may be performed for all the arithmetic parameters or may be performed for a part of the arithmetic parameters. If the integration of the local models 50 is partially performed, information within a range in which integration is not performed may be omitted in the local model information 500 transmitted from the in-vehicle apparatuses 2 to the server apparatus 1.

The controller 11 may generate global model information 450 indicating the new global model 45. The global model information 450 may be configured similarly to the global model information 400. In one example, after generating the new global model 45, the server apparatus 1 may hold the global model information 400 before update and the local model information 500 received from the in-vehicle apparatuses 2 as they are. In another example, the server apparatus 1 may delete at least either the global model information 400 or the local model information 500.

When the generation of the new global model 45 is completed, the controller 11 of the server apparatus 1 ends the processing procedure according to the present operation example. The server apparatus 1 and each in-vehicle apparatus 2 may treat the new global model 45 as the global model 40 and repeatedly execute the federated learning process from step S11. If the evaluation index 70 is not changed in the repeatedly executed federated learning processing procedure, the processes of steps S13 and S23 may be omitted. The processes of steps S13 and S23 may be appropriately executed at the timing of changing the evaluation index 70.

[Characteristics]

In the present embodiment, the selection process by steps S253 to S257 is achieved by exchange of the evaluation values 6 among the in-vehicle apparatuses 2 by proximity communication. According to the selection process by proximity communication, in-vehicle apparatuses 2 to participate in federated learning are selected from among a plurality of in-vehicle apparatuses 2 respectively mounted in vehicles V existing in a geographically close range. Then, it is possible to reflect the local models 50 generated by the selected in-vehicle apparatuses 2 on update of the global model 40 in the process of step S33. Further, it is possible to select the in-vehicle apparatuses 2 to participate in the federated learning in an autonomous distributed manner without via the server apparatus 1. Therefore, according to the present embodiment, it is possible to improve the efficiency of federated learning performed between the server apparatus 1 and the in-vehicle apparatuses 2. Additionally, since data exchanged among the in-vehicle apparatuses 2 in the processes of steps S254 and S255 is only the evaluation values 6, the privacy problem can be solved.

Further, in the present embodiment, the global model 40 and the evaluation index 70 are provided from the server apparatus 1 to each in-vehicle apparatus 2. Thereby, it is possible to flexibly change the global model 40 and the evaluation index 70. For example, the global model 40 and the evaluation index 70 can be appropriately changed for each arbitrary geographic range. By adjusting the global model 40 and the evaluation index 70 so that they are appropriate for accomplishment of an inference task that occurs in each range, it is possible to generate a new global model 45 that can demonstrate a better performance in each range.

4. Modifications

An embodiment of the present disclosure has been described in detail above. However, the description so far is a mere exemplification of the present disclosure in all respects. It goes without saying that various improvements or modifications can be made without departing from the scope of the present disclosure. For example, changes as described below are possible. Modifications below can be appropriately combined.

In the above embodiment, the vehicle V is an example of a mobile body, and the in-vehicle apparatus 2 is an example of an information processing apparatus mounted in the mobile body. However, the mobile body according to the present disclosure need not be limited to a vehicle. The mobile body may be an apparatus configured to be movable, such as a drone or a robot apparatus. The information processing apparatus may be appropriately differently read according to the type of a mobile body the information processing apparatus is to be mounted in.

In the above embodiment, the global model 40 and the evaluation index 70 are provided from the server apparatus 1 to each in-vehicle apparatus 2. However, a method for providing the global model 40 and the evaluation index 70 need not be limited to such an example. In another example, the global model information 400 (the global model 40) may be provided for each in-vehicle apparatus 2 from an external storage device, an external server, the storage medium 92 or the like. In the case of providing the global model 40 for each in-vehicle apparatus 2 in a method other than the method of distribution from the server apparatus 1, the model distribution unit 111 may be omitted from the software configuration of the server apparatus 1, and the processes of steps S11 and S21 may be omitted from the processing procedure of the information processing method according to the above embodiment. Further, in another example, the evaluation index information 700 may be provided for each in-vehicle apparatus 2 from an external storage device, an external server, the storage medium 92 or the like. The evaluation index information 700 may be incorporated in each in-vehicle apparatus 2 in advance. In the case of providing the evaluation index information 700 for each in-vehicle apparatus 2 in a method other than the method of distribution from the server apparatus 1, the index distribution unit 112 may be omitted from the software configuration of the server apparatus 1, and the processes of steps S13 and S23 may be omitted from the processing procedure of the information processing method according to the above embodiment.

In the above embodiment, the order of processes of the steps included in the information processing in FIGS. 7 and 8 may be appropriately changed within a range in which contradiction does not occur. As one example, the processes of steps S11 and S21 may be executed at arbitrary timings before the process of S252 is executed. The processes of steps S13 and S23 may be executed at arbitrary timings before the process of S253 is executed. The order of the processes of steps S11 and S13 may be arbitrarily changed. For example, steps S11 and S13 may be executed at the same time. Alternatively, the process of step S13 may be executed before the process of step S11. The process of step S251 may be executed at an arbitrary timing before the process of S252 is executed. The process of step S252 may be executed at an arbitrary timing before the process of S27 is executed. The process of step S253 may be executed at an arbitrary timing before the process of S254 is executed. The order of the processes of steps S254 and S255 may be arbitrarily changed. For example, the processes of steps S254 and S255 may be executed in parallel.

The information processing method according to the above embodiment is configured to cause an in-vehicle apparatus 2 that has not obtained the evaluation values 6t of the other in-vehicle apparatuses 2 within the predetermined period to participate in federated learning by the process of step S256. However, how to handle such an in-vehicle apparatus 2 that has not obtained the evaluation values 6t of the other in-vehicle apparatuses 2 need not be limited to such an example. The information processing method according to the above embodiment may be configured so that such an in-vehicle apparatus 2 that has not obtained the evaluation values 6t of the other in-vehicle apparatuses 2 does not participate in federated learning. That is, in the case of YES in the determination process of step S256, the controller 21 may end the processing procedure according to the above operation example. In another example, the process of step S256 may be omitted.

5. Supplement

Processes and means described in the present disclosure can be freely combined and implemented as far as technological contradiction does not occur.

Furthermore, a process that is described to be performed by one apparatus may be shared and performed by a plurality of apparatuses. Processes described to be performed by different apparatuses may be performed by one apparatus. Which function is to be implemented by which hardware configuration (server configuration) in a computer system may be flexibly changed.

The present disclosure may also be implemented by supplying computer programs for implementing the functions described in the embodiments described above to a computer, and by one or more processors of the computer reading out and executing the programs. Such computer programs may be provided to the computer by a non-transitory computer-readable storage medium that can be connected to a system bus of the computer, or may be provided to the computer through a network. The non-transitory computer-readable storage medium may be any type of disk including magnetic disks (floppy (registered trademark) disks, hard disk drives (BDDs), etc.) and optical disks (CD-ROMs, DVD discs, Blu-ray discs, etc.), and any type of medium suitable for storing electronic instructions, such as read-only memories (ROMs), random access memories (RAMs), EPROMs, EEPROMs, magnetic cards, flash memories, or optical cards.

What is claimed is:

1. An information processing method including:
collecting, by each of a plurality of information processing apparatuses respectively mounted on different mobile bodies, local data;
generating, by each of the plurality of information processing apparatuses, a local model by performing machine learning of a global model using the collected local data;
calculating, by each of the plurality of information processing apparatuses, an evaluation value according to an evaluation index;
transmitting, by each of the plurality of information processing apparatuses, the calculated evaluation value to other information processing apparatuses respectively mounted on one or more other mobile bodies existing near its own mobile body by proximity communication;
receiving, by each of the plurality of information processing apparatuses, from each of the other information processing apparatuses respectively mounted on the one or more other mobile bodies, the evaluation value calculated by the other information processing apparatus by the proximity communication;
determining, by each of the plurality of information processing apparatuses, whether the calculated evaluation value has a high evaluation or not by comparing the calculated evaluation value and the evaluation values received from the other information processing apparatuses; and
transmitting, by at least one of the information processing apparatuses that has determined that the calculated evaluation value has the high evaluation, local model information indicating the generated local model to a server apparatus.

2. The information processing method according to claim 1, wherein
each of the plurality of information processing apparatuses comprises a beacon module, and
the proximity communication is performed using the beacon module.

3. The information processing method according to claim 1, wherein the evaluation index includes a first index for evaluating a quality of the local data.

4. The information processing method according to claim 1, wherein the evaluation index includes a second index for evaluating a calculation capability of each of the plurality of information processing apparatuses.

5. The information processing method according to claim 1, wherein the evaluation index includes a third index for evaluating a communication capability of each of the plurality of information processing apparatuses.

6. The information processing method according to claim 1, wherein
the evaluation index is expressed by a function, and
each of the plurality of information processing apparatuses calculates the evaluation value by executing arithmetic processing of the function expressing the evaluation index.

7. The information processing method according to claim 1, further comprising:
transmitting, by the server apparatus, the global model to each of the plurality of information processing apparatuses; and
receiving, by each of the plurality of information processing apparatuses, the global model from the server apparatus.

8. The information processing method according to claim 1, further comprising:
transmitting, by the server apparatus, evaluation index information indicating the evaluation index to each of the plurality of information processing apparatuses; and
receiving, by each of the plurality of information processing apparatuses, the evaluation index information from the server apparatus, wherein
each of the plurality of information processing apparatuses calculates the evaluation value according to the evaluation index indicated by the received evaluation index information.

9. An information processing apparatus mounted on a mobile body, the information processing apparatus comprising a controller configured to:
collect local data;
generate a local model by performing machine learning of a global model using the collected local data;
calculate an evaluation value according to an evaluation index;
transmit the calculated evaluation value to other information processing apparatuses respectively mounted on one or more other mobile bodies existing nearby by proximity communication;
receive, from each of the other information processing apparatuses respectively mounted on the one or more other mobile bodies, the evaluation value calculated by the other information processing apparatus according to the evaluation index by the proximity communication;
determine whether the calculated evaluation value has a high evaluation or not by comparing the calculated evaluation value and the evaluation values received from the other information processing apparatuses; and
transmit local model information indicating the generated local model to a server apparatus if determining that the calculated evaluation value has the high evaluation.

10. The information processing apparatus according to claim 9, further comprising a beacon module, wherein
the controller is configured to perform the proximity communication using the beacon module.

11. The information processing apparatus according to claim 9, wherein the evaluation index includes a first index for evaluating a quality of the local data.

12. The information processing apparatus according to claim 9, wherein the evaluation index includes a second index for evaluating a calculation capability.

13. The information processing apparatus according to claim 9, wherein the evaluation index includes a third index for evaluating a communication capability.

14. The information processing apparatus according to claim 9, wherein
the evaluation index is expressed by a function, and
the controller is configured to calculate the evaluation value by executing arithmetic processing of the function expressing the evaluation index.

15. The information processing apparatus according to claim 9, wherein the controller is configured to transmit the evaluation value by broadcast in the proximity communication.

16. A server apparatus configured to be communicable with each of a plurality of information processing apparatuses respectively mounted on different mobile bodies, each of the plurality of information processing apparatuses being configured to collect local data and generate a local model by performing machine learning of a global model using the collected local data, the server apparatus comprising a controller configured to:
receive local model information indicating a local model from at least one information processing apparatus among the plurality of information processing apparatuses; and
generate a new global model by integrating the at least one local model indicated by the local model information received from the at least one information processing apparatus, wherein
each of the plurality of information processing apparatuses is further configured to:
calculate an evaluation value according to an evaluation index;
transmit the calculated evaluation value to other information processing apparatuses respectively mounted on one or more other mobile bodies existing near its own mobile body by proximity communication;
receive, from each of the other information processing apparatuses respectively mounted on the one or more other mobile bodies, the evaluation value calculated by the other information processing apparatus according to the evaluation index by the proximity communication; and
determine whether the calculated evaluation value has a high evaluation or not by comparing the calculated evaluation value and the evaluation values received from the other information processing apparatuses, and
the at least one information processing apparatus is an information processing apparatus that has determined that the calculated evaluation value has the high evaluation as a result of the comparison with the evaluation value.

17. The server apparatus according to claim 16, wherein the controller is further configured to transmit the global model to each of the plurality of information processing apparatuses, and each of the plurality of information processing apparatuses is configured to generate the local model by performing machine learning of the received global model using the collected local data.

18. The server apparatus according to claim 17, wherein the controller is configured to transmit the global model to each of the plurality of information processing apparatuses by broadcast.

19. The server apparatus according to claim 16, wherein the controller is further configured to transmit evaluation index information indicating the evaluation index to each of the plurality of information processing apparatuses, and each of the plurality of information processing apparatuses is configured to calculate the evaluation value according to the evaluation index indicated by the received evaluation index information.

20. The server apparatus according to claim 19, wherein the controller is configured to transmit the evaluation index information to each of the plurality of information processing apparatuses by broadcast.

* * * * *